Dec. 6, 1938.    L. L. SEESTEDT ET AL    2,138,985
GREASE SEPARATOR FOR SINKS AND THE LIKE
Filed May 26, 1937

INVENTORS,
LLOYD L. SEESTEDT,
DAN. RIDGE, AND
HENRY J. LUFF.
BY
ATTORNEY

Patented Dec. 6, 1938

2,138,985

UNITED STATES PATENT OFFICE 2,138,985

GREASE SEPARATOR FOR SINKS AND THE LIKE

Lloyd L. Seestedt and Dan Ridge, Romulus, Mich., and Henry J. Luff, Cleveland Heights, Ohio, assignors to Henry W. Seestedt, doing business as Romulus Gray Iron Foundry, Romulus, Mich.

Application May 26, 1937, Serial No. 144,922

8 Claims. (Cl. 182—9)

This invention relates to grease traps adapted to be connected in waste plumbing lines, such as a line serving a sink or washing machine, to separate and collect entrained grease from the waste stream and thereby prevent clogging the line from grease accumulations, the trap providing for occasional removal of its collected grease and also preferably being arranged to provide a gas seal in the waste line.

The general objects of this invention are to provide such a grease trap or separator for such purpose, of improved structure and manner of functioning as will appear.

More particularly, an object of the invention is to provide a stagnation space within the trap chamber, wherein the grease will be enabled to rise to the liquid surface and there accumulate. Another object is the provision of novel baffle means for locating this stagnation space, the baffle means being so arranged as to provide a cavity within which the grease accumulates, and being easily accessible for removal.

Another object is to provide air cooling means as will appear, whereby a higher percentage of separation may be attained and the separated grease more easily removed from the trap.

Figure 1:
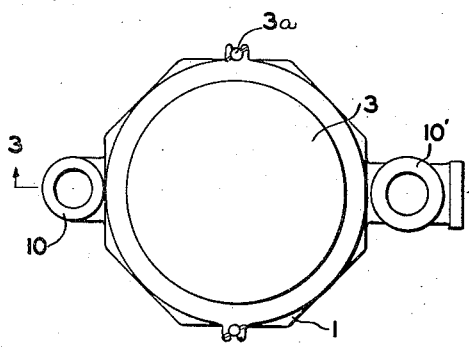
Figure 2:
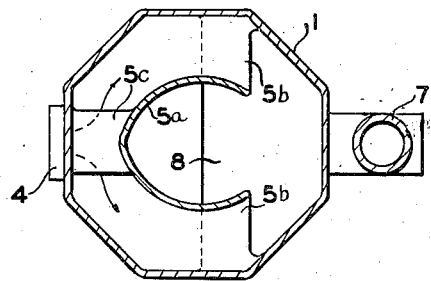
Figure 3:
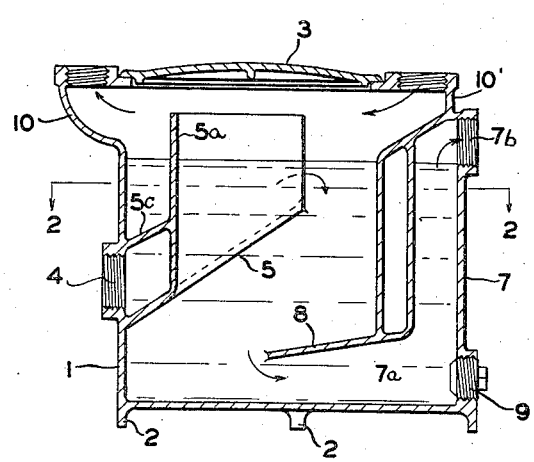
Figure 4:
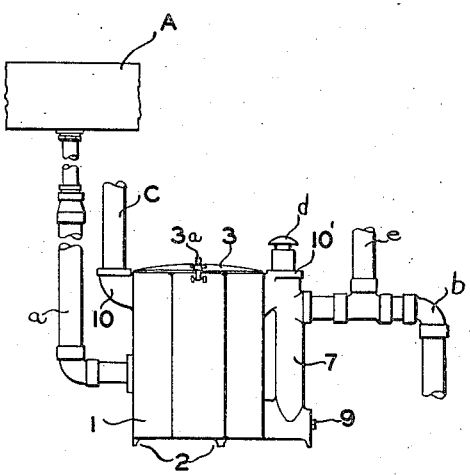

The exact nature of this invention together with further objects and advantages thereof will be apparent from the following description taken in connection with the accompanying drawing, in which Fig. 1 is a top view of a trap or separator embodying the invention; Figs. 2 and 3 are typical sections through the same, Fig. 2 being in the horizontal plane indicated by line 2—2, Fig. 3, and Fig. 3 being in the vertical plane of line 3—3, Fig. 1, Fig. 3 showing also the liquid level and directions of liquid and air flow as when the trap is in service; and Fig. 4 is a view in elevation indicating the manner in which the trap is connected in a typical installation.

With reference now to the drawing, the trap which is preferably of cast metal, has a main hollow container body 1 which is generally cylindrical and may preferably be polygonal with opposed flat sides, and is here shown as octagonal. Legs 2 are provided for the bottom of the container to elevate it above the supporting surface upon which it rests, and permit circulation of air thereunder. A closure 3 is provided for the top of the container which is otherwise open substantially throughout its sectional area, the closure 3 being removably secured in any convenient manner as by the pair of wing nuts 3a indicated in Figs. 1 and 4. The container has an inlet 4 opening into its chamber at one of its side faces, and has, at the opposite side face, outlet means adapted to determine a liquid level for the chamber as will appear. The inlet opening 4 is threaded as indicated, or otherwise adapted for connection with a line $a$ from the apparatus A to be served by the trap as indicated in Fig. 4.

Inlet baffle means generally indicated at 5 is located within the chamber adjacent the inlet opening 4. This baffle means has an upright wall part 5a opposite the inlet opening and extending above the liquid level as indicated in Fig. 3 and curved or otherwise formed to provide passageways thereabout in each lateral direction and to bound or embrace a space therewithin of substantial size and located centrally of the container. The baffle means also has a transversely extending wall part 5b slopingly arranged to close the bottom of the passages about the vertical wall part 5a, and a web part 5c interconnecting the wall part 5a to the container wall just above the inlet opening 4. Thus the effect of the baffle means 5 is to direct the incoming stream laterally and upwardly, and protect the central space within the baffle against turbulent effect from the stream.

The means providing outlet from the container chamber includes a riser 7 having connection at its lower end with the chamber by a short passageway 7a, and having a lateral opening 7b adjacent its upper end threaded or otherwise adapted for connection with the waste line $b$, such waste line preferably having the usual vent riser $e$. The riser 7 is slightly spaced from the container body as indicated in Figs. 2, 3 and 4, so that danger of communication with the container chamber as by casting faults is eliminated.

A generally horizontal outlet baffle 8 extends from the top of the passageway 7a into the container chamber to bound its central quiescent space, with a terminating edge extending approximately diametrically across the container chamber and adjacent the container bottom.

The riser is preferably provided with a plugged cleanout 9 permitting access to the space below the outlet baffle 8 as well as the interior of the riser.

Means are provided for circulating air across the liquid surface within the container. Such means includes an opposed pair of branches 10 and 10', extending laterally adjacent the top of the container body and each having its cavity opening upwardly beside the cover 3. One of these branches, 10, is preferably located above the inlet opening 4, and is threaded for connection with a vent pipe $c$ leading upwardly as to the roof of the building which houses the apparatus. The other branch, 10', is integral with the riser 7 as indicated in Figs. 3 and 4 and is threaded or otherwise arranged to receive a vented cover d which may be of any suitable form to permit free inflow of air but prevent ingress of falling solids.

Operation will be as follows, assuming the trap installed with connections as described and illustrated in Fig. 4. The trap outlet means including the riser 7 determines a liquid level within the trap as indicated in Fig. 3. When the trap receives grease-bearing liquid from the apparatus A through the line a, such liquid will find its way into the stagnation space within the hollow of the inlet baffle portion 5a and above the outlet baffle 8 where the grease will rise to the surface and accumulate. Outflow of liquid from the trap will be substantially without turbulent effect upon the liquid within the stagnation space, the diametric outflow mouth at the bottom of the container chamber beneath the baffle 8 being of large area, the outflowing liquid proceeding from such mouth to the base of the riser 7 with increasing velocity owing to the convergence of the adjacent side walls of the container.

The inflowing liquid being usually hot, the trap is heated by it, thus correspondingly cooling the liquid, and heat dissipation by the trap itself is substantially increased by natural circulation of air thereunder and thereabout provided by the legs 2. The air within the container becomes heated and the pipe c being of greater length than the short pipe d, a thermosiphonic air flow across the liquid surface is automatically set up as indicated by the arrows in Fig. 3, and the grease at the liquid surface is cooled. The directions of flow of both the liquid and the air tend to make this grease accumulate within the hollow of the inlet baffle wall 5a, and the congealing of the accumulated grease caused by its cooling tends to make it easily removable. After a suitable period of service the closure 3 is opened and the accumulated grease removed, all without disturbing any of the trap connections.

What we claim is:

1. A grease trap of the class described comprising a container providing a chamber with a lateral inlet, baffle means arranged within said chamber to direct flow from said inlet laterally and upwardly and to bound a substantial space wherein relative quiescence will be had, and generally horizontal baffle means disposed to provide flow to said outlet from the bottom portion only of said space and to bound the latter.

2. A grease trap of the class described comprising a container having inlet and outlet openings arranged to establish a liquid level within the container chamber, and means providing circulation of air through said chamber over said level.

3. A grease trap of the class described comprising a container having inlet and outlet openings arranged to establish a liquid level within the container chamber, and means providing thermosiphonic circulation of air through said chamber over said level.

4. A grease trap of the class described comprising a container having a removable closure for substantially the entire top of its chamber, outlet means arranged to establish a liquid level within said chamber, and means providing circulation of air through said chamber over said level and comprising a pair of container branches opening upwardly on opposite sides of said closure.

5. A grease trap of the class described comprising a container having a removable closure for substantially the entire top of its chamber, outlet means arranged to establish a liquid level within said chamber, and means providing circulation of air through said chamber over said level and comprising a pair of container branches opening upwardly on opposite sides of said closure, and pipe means rising from one of said branches to create a thermosiphonic draft.

6. A grease trap of the class described comprising a container providing a chamber with lateral inlet and outlet means, said outlet means being arranged to establish a liquid level within said chamber and including a riser and a passage leading thereto from the bottom part of said chamber, means providing circulation of air through said chamber over said level and including a pair of container branches opening upwardly on opposite sides of said chamber, the upper portion of said riser being integral with one of said branches.

7. A grease trap of the class described comprising a container providing a chamber with inlet and outlet means, baffle means arranged within said chamber to direct flow from said inlet laterally in opposite directions and upwardly and provide a substantial space wherein liquid is protected against turbulence from the incoming stream, said baffle means including an upright wall part and a web connecting said wall part to the wall of said container immediately above said inlet.

8. A grease trap of the class described comprising a container providing a chamber having a low lateral inlet, baffle means arranged within said chamber and having a transversely extending wall part arranged to direct flow from said inlet upwardly, and an upright wall part arranged to direct said flow laterally and to extend about a substantial space wherein relative quiescence will be had, said container having means providing an outlet from a low part of said space.

LLOYD L. SEESTEDT.
DAN RIDGE.
HENRY J. LUFF.